(12) United States Patent
Saeki (10) Patent No.: US 11,081,278 B2
(45) Date of Patent: Aug. 3, 2021

(54) CAPACITOR

(71) Applicant: Murata Manufacturing Co., Ltd., Nagaokakyo (JP)

(72) Inventor: Hiromasa Saeki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 13 days.

(21) Appl. No.: 16/106,497

(22) Filed: Aug. 21, 2018

(65) Prior Publication Data

US 2018/0358178 A1    Dec. 13, 2018

Related U.S. Application Data

(63) Continuation of application No. PCT/JP2017/003931, filed on Feb. 3, 2017.

(30) Foreign Application Priority Data

Feb. 23, 2016    (JP) .................. 2016-032335

(51) Int. Cl.

| | |
|---|---|
| *H01G 4/005* | (2006.01) |
| *H01G 4/008* | (2006.01) |
| *H01G 4/12* | (2006.01) |
| *H01G 4/33* | (2006.01) |
| *H01G 4/14* | (2006.01) |
| *H01G 4/08* | (2006.01) |
| *H01G 9/055* | (2006.01) |

(Continued)

(52) U.S. Cl.
CPC .............. *H01G 4/12* (2013.01); *H01G 4/005* (2013.01); *H01G 4/008* (2013.01); *H01G 4/085* (2013.01); *H01G 4/14* (2013.01); *H01G 4/33* (2013.01); *H01G 9/032* (2013.01); *H01G 9/0425* (2013.01); *H01G 9/055* (2013.01)

(58) Field of Classification Search
CPC ............ H01G 9/25; H01G 9/025; H01G 9/04; H01G 9/048; H01G 9/07; H01G 4/12; H01G 4/14; H01G 4/005; H01G 4/33; H01G 4/085; H01G 4/008; H01G 9/032; H01G 9/055; H01G 9/0425
USPC ...... 361/523, 524, 301.1, 301.3, 303, 306.3, 361/311
See application file for complete search history.

(56) References Cited

U.S. PATENT DOCUMENTS

| | | |
|---|---|---|
| 6,852,137 B2 | 2/2005 | Miki et al. |
| 2002/0075633 A1* | 6/2002 | Shimada ................. H01G 9/15 361/508 |

(Continued)

FOREIGN PATENT DOCUMENTS

| | | |
|---|---|---|
| CN | 101964336 A | 2/2011 |
| JP | S5133857 A | 3/1976 |

(Continued)

OTHER PUBLICATIONS

International Search Report issued for PCT/JP2017/003931, dated Apr. 18, 2017.

(Continued)

*Primary Examiner* — Arun Ramaswamy
(74) *Attorney, Agent, or Firm* — Arent Fox LLP (57) ABSTRACT

A capacitor including a conductive porous base material having a plurality of pores, a dielectric layer on the conductive porous base material, an upper electrode on the dielectric layer, and an insulating material that extends into the plurality of pores.

16 Claims, 3 Drawing Sheets

(51) Int. Cl.
*H01G 9/032* (2006.01)
*H01G 9/042* (2006.01)

(56) References Cited

U.S. PATENT DOCUMENTS

| | | | |
|---|---|---|---|
| 2004/0233615 A1* | 11/2004 | Sakai | H01G 9/0029 |
| | | | 361/523 |
| 2011/0127562 A1 | 6/2011 | Sung | |
| 2016/0329158 A1 | 11/2016 | Hattori et al. | |
| 2017/0076872 A1 | 3/2017 | Arakawa et al. | |

FOREIGN PATENT DOCUMENTS

| | | |
|---|---|---|
| JP | 2003100564 A | 4/2003 |
| JP | 2003158042 A | 5/2003 |
| TW | I475583 B | 3/2015 |
| WO | 2015118901 A1 | 8/2015 |
| WO | 2015190278 A1 | 12/2015 |

OTHER PUBLICATIONS

Written Opinion of the International Searching Authority issued for PCT/JP2017/003931, dated Apr. 18, 2017.

* cited by examiner

CAPACITOR

CROSS REFERENCE TO RELATED APPLICATIONS

The present application is a continuation of International application No. PCT/JP2017/003931, filed Feb. 3, 2017, which claims priority to Japanese Patent Application No. 2016-032335, filed Feb. 23, 2016, the entire contents of each of which are incorporated herein by reference.

FIELD OF THE INVENTION

The present invention relates to a capacitor.

BACKGROUND OF THE INVENTION

In recent years, capacitors having higher electrostatic capacitances have been required as capacitors are mounted with higher density in electronic devices. As such a capacitor, for example, Patent Document 1 discloses a capacitor in which a dielectric layer is formed on a metal base material having a porous structure and an upper electrode is further formed on the dielectric layer. Since such a capacitor has a large surface area per volume of the base material, it is possible to increase the area of a capacitance-forming part and to obtain a high electrostatic capacitance.

Patent Document 1: International Publication WO 2015/118901

SUMMARY OF THE INVENTION

Figure 5:
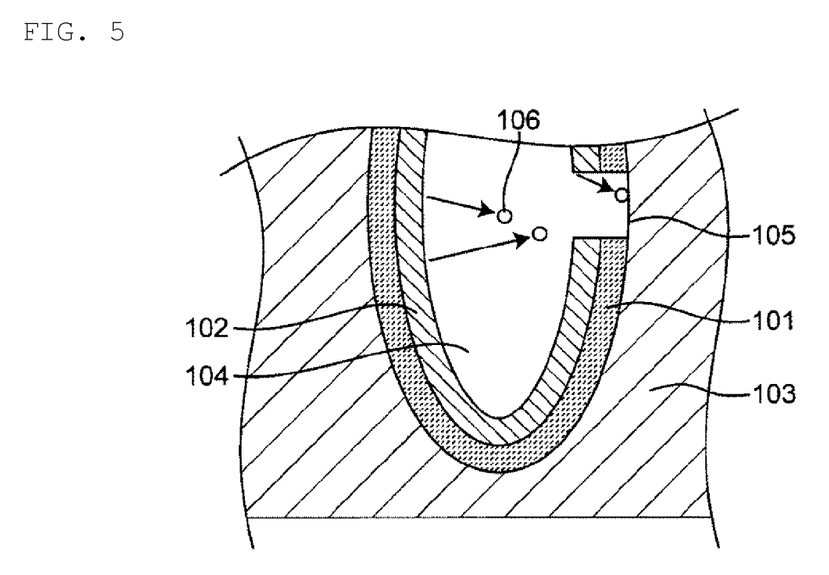
FIG. 5 is a schematic view showing a schematic cross-section of pores for explaining a leakage current in a conventional capacitor.

Since a capacitor including a metal base material having a porous structure as described in Patent Document 1 needs to form a dielectric layer and an upper electrode layer in pores, the thicknesses of the dielectric layer and the upper electrode layer are very small. As a result, although the electrostatic capacitance increases, the mechanical strength of the dielectric layer and the upper electrode layer is lowered, cracks may be produced or peeling may occur in some cases. As shown in FIG. 5, when crack or peeling occur in a dielectric layer 101 and an upper electrode layer 102, a metal base material 103 is exposed to the inside of a pore (hereinafter, simply referred to as a pore) 104. Since the pores are very small and the distance between an exposed portion 105 and the upper electrode layer 102 is small, as shown by an arrows, electrons 106 migrate from the cathode (the upper electrode layer 102 in FIG. 5) to the anode (in FIG. 5, the metal base material 103) and a leakage current occurs.

It is an object of the present invention to provide a capacitor including a conductive porous base material, a dielectric layer positioned on the conductive porous base material, and an upper electrode positioned on the dielectric layer, whereby occurrence of a leakage current is suppressed even when a crack or peeling occurs in the dielectric layer and the upper electrode.

In order to solve the above-mentioned problem, the present inventor made earnest investigations, and consequently found that even when crack or peeling occurs in the dielectric layer and the upper electrode, a leakage current can be suppressed by disposing an insulating material in the pores of the conductive porous base material, and these findings have now led to completion of the present invention.

According to the gist of the present invention, there is provided a capacitor that includes a conductive porous base material having a porous portion with a plurality of pores; a dielectric layer on the conductive porous base material; an upper electrode on the dielectric layer; and an insulating material on the upper electrode and extending into at least some of the plurality of pores.

In one aspect of the above capacitor, at least some of the pores of the conductive porous base material are filled with an insulating material.

In another aspect of the above capacitor, the upper electrode is covered with an insulating material in the pores of the conductive porous base material.

According to the present invention, even when a crack or peeling occurs in the dielectric layer and the upper electrode, a leakage current is hardly generated by disposing an insulating material in the pores of the conductive porous base material.

DETAILED DESCRIPTION OF THE INVENTION

Hereinafter, a capacitor of the present invention will be described in detail with reference to the drawings. However, the shapes and arrangements of the capacitors and the respective constituent elements of the present embodiment are not limited to the illustrated examples.

First Embodiment

Figure 1:
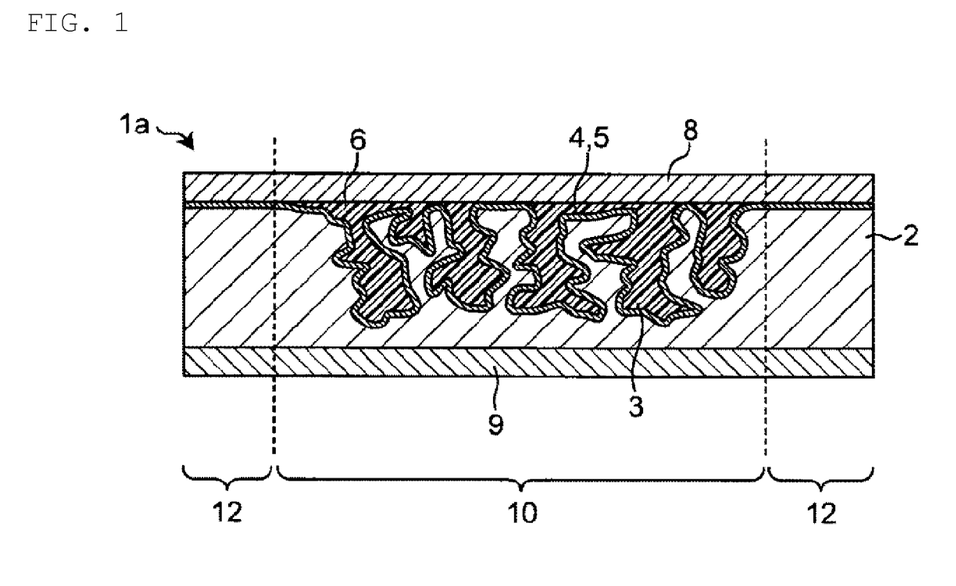
FIG. 1 is a schematic cross-sectional view of a capacitor 1a in an embodiment of the present invention.
Figure 2:
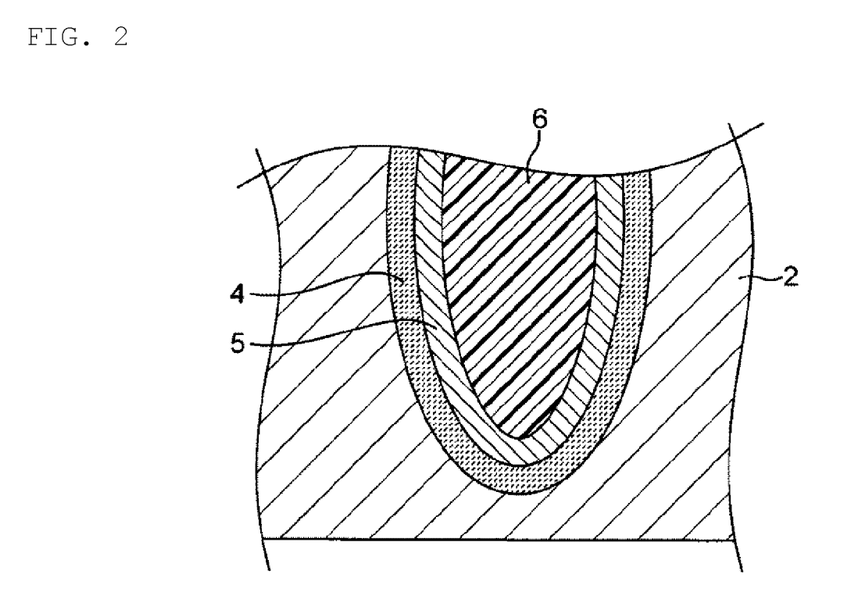
FIG. 2 is a schematic view showing a cross-section of pore of the capacitor 1a shown in FIG. 1.

FIG. 1 is a schematic cross-sectional view of a capacitor 1a of the present embodiment, and FIG. 2 is a schematic cross-sectional view of a pore portion of the capacitor 1a. In FIG. 1, a dielectric layer 4 and an upper electrode 5 are shown as one layer for simplicity. A capacitor 1 of the present embodiment has a substantially rectangular parallelepiped shape, and is roughly composed of a conductive porous base material 2, a dielectric layer 4 formed on the conductive porous base material 2, an upper electrode 5 formed on the dielectric layer 4, and a filling portion 6 formed of an insulating material in pores 3, as shown in FIG. 1 and FIG. 2. The capacitor 1a further includes a first external electrode 8 on the upper surface of the capacitor 1a (a surface on the side of the pores of the conductive porous base material 2, an upper side surface in FIG. 1) and a second external electrode 9 on the lower surface (a main surface having no pores of the conductive porous base material 2, a lower side surface in FIG. 1). The conductive porous base material 2 faces the upper electrode 5 with the dielectric layer 4 interposed therebetween and constitutes a capacitance-forming part. Charge can be accumulated in the dielectric layer 4 by applying a voltage between the conductive porous base material 2 and the upper electrode 5.

In the capacitor 1a, since the insulating material is filled in the pores, crack or peeling of the dielectric layer and the upper electrode can be suppressed, and it is possible to prevent the emission of electrons from the surface of the upper electrode and to suppress the occurrence of leakage current even when crack or peeling occurs in the dielectric layer and the upper electrode.

The conductive porous base material 2 has a porous portion 10 having a porous structure, and the material and the constitution thereof are not limited as long as the surface is conductive. For example, as the conductive porous base material, a porous metal base material, a base material obtained by forming a conductive layer on the surface of a porous silica material, a porous carbon material or a porous ceramic sintered body, and the like can be mentioned. In a preferred embodiment, the conductive porous base material is a porous metal base material.

Examples of the metal constituting the porous metal base material include metals such as aluminum, tantalum, nickel, copper, titanium, niobium and iron, and alloys such as stainless steel and duralumin, and the like. In one embodiment, the porous metal base material can be an aluminum or nickel porous base material, in particular an aluminum porous base material.

The void ratio in the porous portion 10 can be preferably 20% or more, more preferably 30% or more, further preferably 50% or more, still more preferably 60% or more. By increasing the void ratio, the capacitance of the capacitor can be more increased. From the viewpoint of enhancing the mechanical strength, the void ratio of the porous portion 10 can be preferably 90% or less, and more preferably 80% or less.

In the present specification, the term "void ratio" refers to the proportion of voids in the conductive porous base material. The void ratio can be measured as follows. Although the voids of the conductive porous base material can be finally filled with the dielectric layer, the upper electrode, and the like in the process of manufacturing the capacitor, the above "void ratio" is calculated considering the filled portion as a void without considering substances filled as described above.

First, the conductive porous base material is processed by a FIB (focused ion beam) micro sampling method and processed into a slice sample having a thickness of 60 nm or less. A damage layer on the surface of the sample formed during FIB processing is removed by Ar ion milling. A predetermined region (3 μm×3 μm) of the slice sample is measured by STEM (scanning transmission electron microscope)-EDS (energy dispersive X-ray spectroscopy) mapping analysis. An area where the conductive porous base material is present within a field of view of mapping measurement is determined. Then, the void ratio can be calculated from the following equation. This measurement is performed at arbitrary three locations, and an average value of the measured values is taken as the void ratio.

Void ratio (%)=((measurement area−area where conductive porous base material is present)/measurement area)×100

The porous portion 10 is not particularly limited; however, it has an area enlargement ratio preferably of 30 times or more and 10000 times or less, more preferably 50 times or more and 5000 times or less, for example, 200 times or more and 600 times or less. Here, the area enlargement ratio means a surface area per unit projected area. The surface area per unit projected area can be obtained from an adsorption amount of nitrogen at liquid nitrogen temperature using a BET specific surface area measuring apparatus.

In one embodiment, the average pore size of the pores of the porous portion is not particularly limited; however, it can be preferably 10 nm or more and 10 μm or less, more preferably 100 nm or more and 1.0 μm or less, and further preferably 150 nm or more and 500 nm or less. By making the average pore size of the pores larger, it is easy to form each layer in the pores and to fill the insulating material, and the like. Further, by making the average pore size of the pores smaller, the number of pores in the porous portion can be increased, the area enlargement ratio can be increased, and the electrostatic capacitance can be more increased. The smaller the average pore size of the pores is, the closer the facing surfaces are, so leakage current tends to occur when cracks are produced in the dielectric layer. Therefore, the present invention that can suppress the leakage current is more effective when the average pore size of the pores is small.

The average pore size of the pores of the porous portion can be measured by a gas adsorption method. Specifically, a pore distribution can be measured by physically adsorbing the gas on the pore surface, and determining the relationship between the adsorption amount and the relative pressure. Typically, nitrogen is used as the gas.

A low void ratio portion 12 exists in the conductive porous base material 2. In the present specification, the "low void ratio portion" means a portion having a lower void ratio than the porous portion. In FIG. 1, the low void ratio portion 12 is shown on the left and right of the conductive porous base material 2, but the low void ratio portion 12 exists so as to surround the porous portion 10. That is, the low void ratio portion 12 exists also in the back and front in the drawing. The low void ratio portion 12 is a region having a lower void ratio than the porous portion 10. In the low void ratio portion 12, pores do not have to be present.

The low void ratio portion 12 contributes to the improvement of the mechanical strength of the capacitor. From the viewpoint of enhancing the mechanical strength, the void ratio of the low void ratio portion 12 is preferably a void ratio of 60% or less of the void ratio of the porous portion 10, and more preferably a void ratio of 50% or less of the void ratio of the porous portion 10. For example, the void ratio of the low void ratio portion 12 is preferably 20% or less, and more preferably 10% or less. Further, the void ratio of the low void ratio portion 12 may be 0%. That is, the low void ratio portion may have a porous structure or does not have to have a porous portion. The lower the void ratio of the low void ratio portion is, the higher the mechanical strength of the capacitor is.

The low void ratio portion 12 can exist in an amount of preferably 5% by volume or more and 50% by volume or less, more preferably 8% by volume or more and 40% by volume or less, and further preferably 10% by volume or more and 35% by volume or less, for example, 15% by volume or more and 30% by volume or less, and 20% by volume or more and 30% by volume or less, of the conductive porous base material 2. When the low void ratio portion 12 exists in an amount of 5% by volume or more, the mechanical strength of the capacitor is further improved. Further, when the low void ratio portion 12 exists in an amount of 50 vol % or less, the electrostatic capacitance of the capacitor can be further increased.

Although the conductive porous base material 2 of the present embodiment has the low void ratio portion 12, the low void ratio portion is not an indispensable element. Also, in the case of providing the low void ratio portion 12, the existence position, number of installations, size, shape and the like are not particularly limited.

In the capacitor 1a of the present embodiment, the dielectric layer 4 is formed on the conductive porous base material 2.

A material for forming the dielectric layer 4 is not particularly limited as long as the material has insulating properties, and preferred examples thereof include metal oxides such as $AlO_x$ (e.g., $Al_2O_3$), $SiO_x$ (e.g., $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$ and $SiAlO_x$; metal nitrides such as $AlN_x$, $SiN_x$ and $AlScN_x$; and metal oxynitrides such as $AlO_xN_y$, $SiO_xN_y$, $HfSiO_xN_y$ and $SiC_xO_yN_z$, and $AlO_x$, $SiO_x$, $SiO_xN_y$, and $HfSiO_x$ are preferred. It is to be noted that the above formula merely expresses the constitution of the material, and does not limit the composition. That is, x, y, and z attached to O and N may be any value greater than 0, and the existence ratio of each element including metal elements is optional.

The dielectric layer 4 may be formed of one dielectric layer or two or more dielectric layers. That is, the dielectric layer may be a single layer or a multilayer. In the case of multilayers, each layer may be formed of different kinds of materials.

A thickness of the dielectric layer 4 is not particularly limited; however, it is preferably 5 nm or more and 100 nm or less, and more preferably 10 nm or more and 50 nm or less, for example. By setting the thickness of the dielectric layer to 5 nm or more, insulating properties can be enhanced and the leakage current can be further reduced. Further, by setting the thickness of the dielectric layer to 100 nm or less, a larger electrostatic capacitance can be obtained.

The dielectric layer is preferably formed by a vapor phase method such as a vacuum deposition method, a chemical vapor deposition (CVD) method, a sputtering method, an atomic layer deposition (ALD) method, and a pulsed laser deposition (PLD) method. The CVD method or the ALD method is more preferred, and the ALD method is particularly preferred since a more homogeneous and dense film can be formed even in smaller portions of the pores of the conductive porous base material.

In the capacitor 1a of the present embodiment, the upper electrode 5 is formed on the dielectric layer 4. In the present invention, the upper electrode means an electrode layer (an electrode layer furthest from the conductive base material) present in the innermost side of the pores among the electrode layers present in the pores.

The material constituting the upper electrode 5 is not particularly limited as long as it is conductive, and examples of the material include Ni, Cu, Al, W, Ti, Ag, Au, Pt, Zn, Sn, Pb, Fe, Cr, Mo, Ru, Pd, Ta and alloys thereof such as CuNi, AuNi and AuSn, metal nitrides such as TiN, TiAlN, and TaN, metal oxynitrides such as TiON and TiAlON, conductive polymers such as PEDOT (poly(3,4-ethylenedioxythiophene)), polypyrrole, and polyaniline. TiN or TiAlN is preferred, and TiN is more preferred.

The upper electrode 5 may be formed of one upper electrode layer or two or more upper electrode layers. That is, the upper electrode may be a single layer or a multilayer. In the case of multilayers, each layer may be formed of different kinds of materials.

A thickness of the upper electrode 5 is not particularly limited; however, it is preferably 3 nm or more, and more preferably 10 nm or more, for example. By setting the thickness of the upper electrode to 3 nm or more, the resistance of the upper electrode itself can be reduced.

A method of forming the upper electrode 5 is not particularly limited as long as it is a method capable of covering the dielectric layer, and examples thereof include an ALD method, a CVD method, plating, bias sputtering, a sol-gel method, conductive polymer filling, and the like. The CVD method or the ALD method is more preferred, and the ALD method is particularly preferred since a more homogeneous and dense film can be formed even in smaller portions of the pores of the porous member.

In the capacitor 1a of the present embodiment, the filling portion 6 exists in the pores 3.

The filling portion 6 is made of an insulating material and is formed by filling pores with the insulating material.

The insulating material is not particularly limited as long as it is a material having insulating properties. The specific resistance of the insulating material is preferably $1 \times 10^{12}$ Ω·cm or more, and more preferably $1 \times 10^{14}$ Ω·cm or more.

Examples of the insulating material include a resin material and an insulating inorganic material, and specific examples thereof include an epoxy resin, a phenol resin, a polyimide resin, a silicone resin, a silane crosslinkable resin, $AlO_x$ (for example, $Al_2O_3$), $SiO_x$ (for example, $SiO_2$), SiN, and the like.

When filling the pores, a resin material such as an epoxy resin, a phenol resin, or a silicone resin is preferred as an insulating material to be filled, and an epoxy resin or a phenol resin is more preferred.

In one embodiment, the insulating material to be filled is an epoxy resin. Impact resistance of the capacitor can be enhanced by filling the epoxy resin.

In another embodiment, the insulating material to be filled is a silicon-containing material, for example a silicone resin. The silicon-containing material is excellent in a filling property and has little curing shrinkage, and therefore generation of voids during curing can be suppressed.

The filling ratio of the insulating material is preferably 50% by volume or more, more preferably 80% by volume or more, further preferably 90% by volume or more, still more preferably 95% by volume or more, for example, 98% by volume or more or 99% by volume or more, and most preferably substantially 100% by volume with respect to all pores of the porous portion, that is, the pores of the porous portion are substantially completely filled with the insulating material.

In the present specification, the "filling ratio" refers to the proportion of the insulating material in the pores of the porous portion. The filling ratio can be measured as follows. The void of the porous portion means a void after the formation of the dielectric layer, the upper electrode, and the like (in a state in which the filling portion is not formed). Specifically, the filling ratio is calculated as follows.

First, the capacitor is processed by a FIB micro sampling method and processed into a slice sample having a thickness of 60 nm or less. A predetermined region (3 μm×3 μm) of the slice sample is measured by STEM-EDS mapping analysis. Within a field of view of mapping measurement, an area of voids of the porous portion in the case where a filling portion is not present is determined. Next, the area where the insulating material exists in the pores is determined. Then, the filling ratio can be calculated from the following equation. This measurement is performed at arbitrary three places, and the average value of the measured values is taken as the filling ratio.

Filling ratio (%)=(area where insulating material exists/area of void of porous portion)×100

A method of filling the insulating material in pores is not particularly limited, and examples thereof include a dipping method, a dispenser method, and the like. In a preferred embodiment, after the dipping method or the dispenser method, vacuum degassing and filling are preferably carried out.

In the present embodiment, the first external electrode 8 is formed on the upper surface of the capacitor 1a and the second external electrode 9 is formed on the lower surface of the capacitor 1a.

Materials constituting the first external electrode 8 and the second external electrode 9 are not particularly limited, and examples thereof include metals such as Au, Pb, Pd, Ag, Sn, Ni, Cu, Ti and the like, alloys thereof, and conductive polymers. A method of forming the first external electrode 8 and the second external electrode 9 is not particularly limited and, for example, a CVD method, electrolytic plating, electroless plating, vapor deposition, sputtering, baking of a conductive paste, or the like can be used, and electrolytic plating, electroless plating, vapor deposition, sputtering and the like are preferred.

In the capacitor 1a, the first external electrode 8 and the second external electrode 9 are disposed on the entire main surfaces of the capacitor, but the present invention is not limited thereto, and it is possible to dispose the first external electrode 8 and the second external electrode 9 in an optional shape and size only on a part of each surface of the capacitor. In addition, the first external electrode 8 and the second external electrode 9 are not indispensable elements and do not have to be present. When they are not present, the upper electrode 5 also functions as a first external electrode and the conductive porous base material 2 also functions as a second external electrode. That is, the upper electrode 5 and the conductive porous base material 2 may function as a pair of electrodes. In this case, the upper electrode 5 may function as an anode and the conductive porous base material 2 may function as a cathode. Alternatively, the upper electrode 5 may function as a cathode and the conductive porous base material 2 may function as an anode.

Second Embodiment

Figure 3:
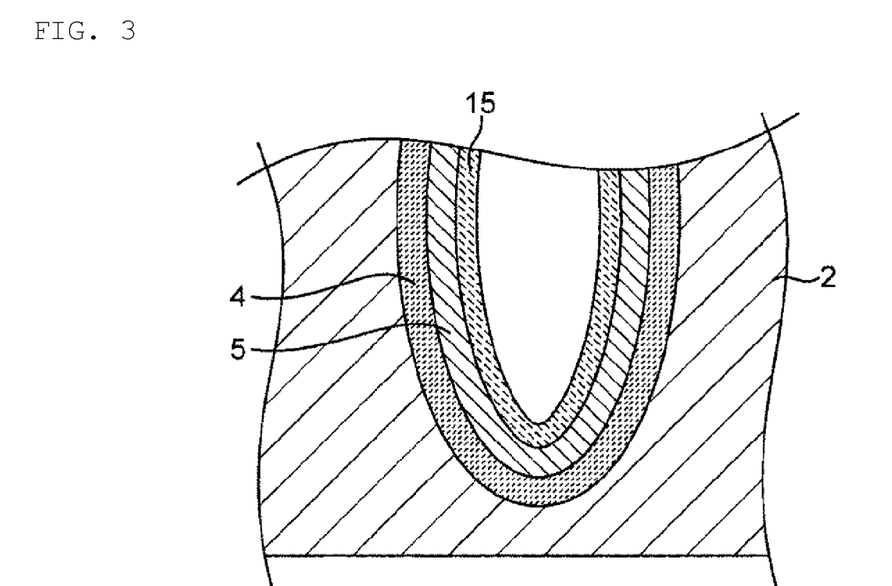
FIG. 3 is a schematic view showing a cross-section of pores of a capacitor 1b in another embodiment of the present invention.

FIG. 3 schematically shows a cross-sectional view of the pore portion of the capacitor 1b of the present embodiment.

The capacitor 1b of the present embodiment is different from the above capacitor 1a in that the insulating material is not filled so as to fill the pores but exists in a layered manner in the pore 3 so as to cover the upper electrode. That is, in the capacitor 1b, an insulating layer 15 is formed on the upper electrode 5.

In the capacitor 1b, since the upper electrode is covered with the insulating layer, it is possible to prevent the emission of electrons from the surface of the upper electrode and to suppress the occurrence of leakage current even when crack or peeling occurs in the dielectric layer and the upper electrode.

As the insulating material constituting the insulating layer 15, an insulating inorganic material such as $AlO_x$ (for example, $Al_2O_3$), $SiO_x$ (for example, $SiO_2$), and the like are preferred.

A thickness of the insulating layer 15 is not particularly limited; however, it is preferably, for example, 5 nm or more, and more preferably 10 nm or more. By setting the thickness of the insulating layer 15 to 5 nm or more, insulating properties can be enhanced and a leakage current can be further suppressed. An upper limit of the thickness of the insulating layer 15 is not particularly limited, and the thickness may be, for example, 100 nm or less or 50 nm or less.

The insulating layer 15 is preferably formed by a vapor phase method such as a vacuum deposition method, a CVD method, a sputtering method, an ALD method, and a PLD method. The CVD method or the ALD method is more preferred, and the ALD method is particularly preferred since a more homogeneous and dense film can be formed even in smaller portions of the pores of the conductive porous base material.

Third Embodiment

Figure 4:
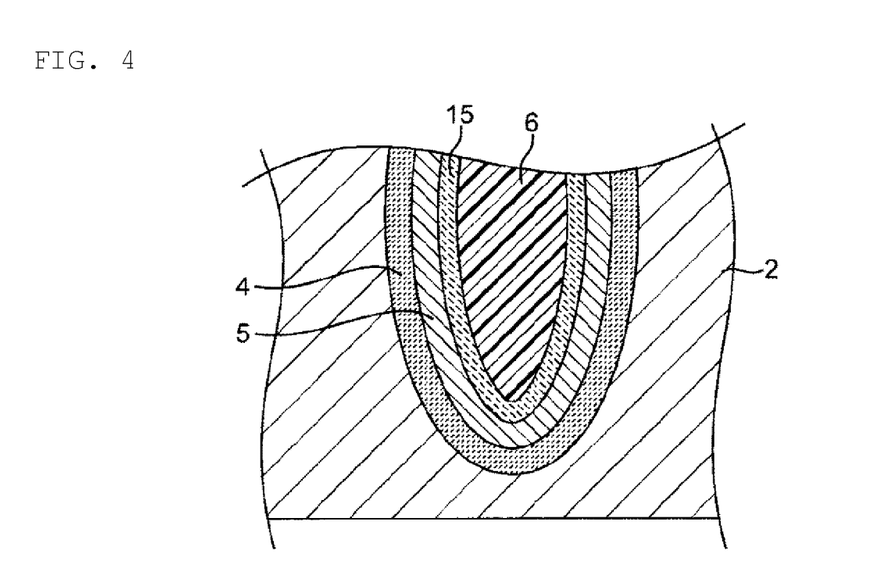
FIG. 4 is a schematic view showing a cross-section of pores of a capacitor 1c in another embodiment of the present invention.

FIG. 4 schematically shows a cross-sectional view of the pore portion of the capacitor 1c of the present embodiment.

The capacitor 1c of the present embodiment is different from the above capacitors 1a and 1b in that one of the insulating materials exists in a layered manner so as to cover the upper electrode, and the other is further filled so as to fill the pores. That is, in the capacitor 1c, in the pores 3, the insulating layer 15 is formed on the upper electrode 5 and a filling portion 6 is further formed. It can be said that the capacitor 1c is a combination of the features of both the capacitors 1a and 1b.

In the capacitor 1c, since the upper electrode is covered with the insulating layer and further the pores are filled with the insulating material, crack or peeling of the dielectric layer and the upper electrode can be suppressed, and it is possible to prevent the emission of electrons from the surface of the upper electrode and to further suppress the occurrence of leakage current even when crack or peeling occurs in the dielectric layer and the upper electrode.

In the capacitor 1c, the filling portion 6 and the insulating layer 15 are similar to the filling portion 6 and the insulating layer 15 of the capacitor 1a and the capacitor 1b, respectively, and can be similarly formed.

Although the capacitors 1a to 1c of the present embodiment have been described above, various modifications are possible for the capacitor of the present invention.

For example, in the above embodiment, the capacitor has a substantially rectangular parallelepiped shape, but the present invention is not limited thereto. The capacitor of the present invention can have an optional shape, and for example, a planar shape may be a circle, an ellipse, a quadrangle with a rounded corner, or the like.

In the above-described embodiment, the conductive porous base material 2 has the porous portion only on one main surface, but the present invention is not limited thereto. That is, the porous portion may be present on two main surfaces. Further, the existence position, number of installations, size, shape, and the like of the porous portion are not particularly limited.

In one embodiment, the capacitor of the present invention has only to have a dielectric layer being present between the conductive porous base material and the upper electrode, and a layer other than the layers described in the above embodiments may be present.

For example, in one embodiment, another layer may be present between the conductive porous base material and the dielectric layer.

In another embodiment, another layer may be present between the dielectric layer and the upper electrode.

In another embodiment, an electrode layer and an dielectric layer may further be present between the dielectric layer and the upper electrode.

EXAMPLES

Examples 1 and 2, and Comparative Example 1

An aluminum etching foil having a void ratio of 42.5% in which an average pore size of the porous portion was about 200 nm was prepared. The void ratio of the aluminum etching foil was measured as follows.

The aluminum etching foil was processed by the FIB micro sampling method with a focused ion beam apparatus (SM 13050 SE, manufactured by SII NanoTechnologies, Inc.) to expose a cross section of the aluminum etching foil. A sample for TEM observation in cross-section of a porous portion was prepared by the FIB micro sampling method, STEM-EDS mapping photograph was taken at arbitrary three locations in the cross section at magnification of 50000 times, the area of the void portion was measured from the photograph, and the area of the void portion with respect to the whole area was determined. The average value of the three measurement results was taken as the void ratio. A damaged layer on the surface of the sample formed during FIB processing was removed by Ar ion milling.

The above aluminum etching foil was cut into three pieces, each of which was designated as a foil A (Example 1), a foil B (Example 2), and a foil C (Comparative Example 1).

For each of these aluminum etching foils, an $Al_2O_3$ layer with a thickness of 15 nm was formed on foil by an ALD method in which a process of alternately supplying a trimethylaluminum ($Al(CH_3)_3$) gas and water vapor ($H_2O$) was repeated a predetermined number of times. Subsequently, a $SiO_2$ layer with a thickness of 10 nm was formed on the $Al_2O_3$ layer by an ALD method in which a process of alternately supplying tris(dimethylamino)silane ($SiH[N(CH_3)_2]_3$) and an ozone/oxygen ($O_3/O_2$) mixed gas was repeated a predetermined number of times. These layers were used as dielectric layers.

Next, a TiN layer with a thickness of 10 nm was formed as an upper electrode layer on the dielectric layer by an ALD method in which a process of alternately supplying a $TiCl_4$ (titanium tetrachloride) gas and an ammonia ($NH_3$) gas was repeated a predetermined number of times.

Next, for the foil A, an $SiO_2$ layer of about 4 nm was further formed on the TiN layer by an ALD method.

Thereafter, a positive type photosensitive epoxy resin was applied to each of the foil A and the foil B by a dipping method, and the epoxy resin was filled in the porous portion by vacuum degassing. Then, provisional drying was carried out at 95° C., ultraviolet exposure and alkali development were carried out to remove an excessive epoxy resin remaining on the base material, and then the epoxy resin was cured at 150° C. to form a filling portion in the pores.

Thereafter, the $SiO_2$ exposed to the surface of the foil A was removed using 5% diluted hydrofluoric acid.

Finally, a Ti/Cu layer as an external electrode was formed on each of the foil A, the foil B, and the foil C by a sputtering method and cut into individual capacitors to prepare samples.

In the capacitor of Example 1 (foil A), in the pores, the upper electrode is covered with the $SiO_2$ layer, and the inside of the pores are filled with the epoxy resin. The capacitor of Example 2 (foil B) has no $SiO_2$ layer on the upper electrode, but the inside of the pores are filled with epoxy resin. The capacitor of Comparative Example 1 (foil C) does not have an $SiO_2$ layer on the upper electrode, and the inside of the pores are not filled.

(Evaluation)
Withstand-Voltage Test

With respect to 100 samples each, the withstand voltage was evaluated. Specifically, a voltage was applied between the external electrodes of the sample, and the proportion of the sample in which the current value flowing in the range of 3 to 5V rapidly becomes large was examined. That is, the ratio of the sample where leakage current occurs was examined. The results are shown in the following table.

TABLE 1

| | Dielectric Layer | Upper Electrode | Insulating Layer | Filling Portion | Frequency of Occurrence of Leakage Current |
|---|---|---|---|---|---|
| Example 1 | $Al_2O_3/SiO_2$ | TiN | $SiO_2$ | epoxy resin | 1% |
| Example 2 | $Al_2O_3/SiO_2$ | TiN | — | epoxy resin | 2% |
| Comparative Example 1 | $Al_2O_3/SiO_2$ | TiN | — | — | 92% |

From the above results, it was confirmed that the frequency of occurrence of the leakage current is small in Examples 1 and 2 in which the insulating material was present in the pores. In particular, in Example 1 in which the insulating layer was formed on the upper electrode and the filling portion was formed in the pores, the frequency of occurrence of the leakage current was very small.

Example 3 and Comparative Example 2

An aluminum etching foil having a void ratio of 42.8% in which an average pore size of the porous portion was about 200 nm was prepared. The void ratio of the aluminum etching foil was measured in the same manner as described above. The aluminum etching foil was cut into two pieces, and each was designated as a foil D (Example 3) and a foil E (Comparative Example 2).

For each of these aluminum etching foils, an $Al_2O_3$ layer with a thickness of 15 nm was formed on the foil by an ALD method in which a process of alternately supplying a trimethylaluminum ($Al(CH_3)_3$) gas and water vapor ($H_2O$) was repeated a predetermined number of times. Subsequently, a $SiO_2$ layer with a thickness of 10 nm was formed on the $Al_2O_3$ layer by an ALD method in which a process of alternately supplying tris(dimethylamino)silane ($SiH[N(CH_3)_2]_3$) and an ozone/oxygen ($O_3/O_2$) mixed gas was repeated a predetermined number of times. Further, an $HfO_2$ layer with a thickness of 5 nm was formed on the $SiO_2$ layer by an ALD method in which a process of alternately supplying tetrakis(dimethylamino)hafnium (TDMAHf) and an ozone/oxygen ($O_3/O_2$) mixed gas was repeated a predetermined number of times. These layers were used as dielectric layers.

Next, a Ru layer with a thickness of 10 nm was formed as an upper electrode layer on the dielectric layer by an ALD method in which a process of alternately supplying a $Ru(EtCp)_2$ (cyclopentadienyl ruthenium) gas and an oxygen ($O_2$) gas was repeated a predetermined number of times.

Next, for the foil D, an $Al_2O_3$ layer with a thickness of about 5 nm was further formed on the Ru layer by the ALD method.

Thereafter, a positive type photosensitive resist (AZ 6124 manufactured by AZ Electronic Materials Co., Ltd.) was applied to the foil D by a dipping method, and the resist was filled in the porous portion by vacuum degassing. Then, provisional drying was carried out at 110° C., ultraviolet exposure and alkali development were carried out to remove excessive resist remaining on the base material to expose the $Al_2O_3$ layer on the surface. Thereafter, the $Al_2O_3$ layer exposed to the surface was removed using 5% diluted hydrofluoric acid. Further, the resist in the pores was removed by dipping the foil in acetone.

Finally, a Ti/Cu layer as an external electrode was formed on each of the foil D and the foil E by a sputtering method, and cut into individual capacitors to prepare samples.

In the capacitor of Example 3 (foil D), the upper electrode is covered with $Al_2O_3$ in the pores, and the inside of the pores is not filled. The capacitor of Comparative Example 2 (foil E) does not have an $Al_2O_3$ layer on the upper electrode and the inside of the pores is not filled.

(Evaluation)

Withstand-Voltage Test

With respect to 100 samples each, the withstand voltage was evaluated. Specifically, a voltage was applied between the external electrodes of the sample, and the proportion of the sample in which the current value flowing in the range of 3 to 5V rapidly becomes large was examined. That is, the ratio of the sample where leakage current occurs was examined. The results are shown in the following table.

TABLE 2

| | Dielectric Layer | Upper Electrode | Insulating Layer | Filling Portion | Frequency of Occurrence of Leakage Current |
|---|---|---|---|---|---|
| Example 3 | $Al_2O_3/SiO_2/HfO_2$ | Ru | $Al_2O_3$ | — | 10% |
| Comparative Example 2 | $Al_2O_3/SiO_2/HfO_2$ | Ru | — | — | 78% |

From the above results, it was confirmed that the frequency of occurrence of the leakage current is small in Example 3 in which the upper electrode is covered with the $Al_2O_3$ layer in the pores Example 4 and Comparative Example 3

An aluminum etching foil having a void ratio of 42.3% in which an average pore size of the porous portion was about 200 nm was prepared. The void ratio of the aluminum etching foil was measured in the same manner as described above. The aluminum etching foil was cut into two pieces, and each was designated as a foil F (Example 4) and a foil G (Comparative Example 3).

For each of these aluminum etching foils, a layer of $HfO_2/SiO_2$ superlattice with a thickness of 25 nm was formed as the dielectric layer on the foil by an ALD method in which a process of alternately supplying tetrakis(dimethylamino)hafnium (TDMAHf) and an ozone/oxygen ($O_3/O_2$) mixed gas, and a process of alternately supplying tris (dimethylamino)silane ($SiH[N(CH_3)_2]_3$) and an ozone/oxygen ($O_3/O_2$) mixed gas were repeated a predetermined number of times.

Next, a Ru layer with a thickness of 10 nm was formed as an upper electrode layer on the dielectric layer by an ALD method in which a process of alternately supplying a $Ru(EtCp)_2$ (cyclopentadienyl ruthenium) gas and an oxygen ($O_2$) gas was repeated a predetermined number of times.

Next, a silane crosslinkable resin was applied to the foil F by a dipping method, and the porous portion was filled with a silane-based coating agent by vacuum degassing and cured at 250° C.

Thereafter, the Ru electrode near the surface of the foil was exposed using 5% diluted hydrofluoric acid.

Finally, a Ti/Cu layer as an external electrode was formed on each of the foil F and the foil G by a sputtering method, and cut into individual capacitors to prepare samples.

In the capacitor of Example 4 (foil F), the pores are filled with a silane crosslinkable resin. In the capacitor of Comparative Example 3 (foil G), pores are not filled.

(Evaluation)

Withstand-Voltage Test

With respect to 100 samples each, the withstand voltage was evaluated. Specifically, a voltage was applied between the external electrodes of the sample, and the proportion of the sample in which the current value flowing in the range of 3 to 5V rapidly becomes large was examined. That is, the ratio of the sample where leakage current occurs was examined. The results are shown in the following table.

TABLE 3

| | Dielectric Layer | Upper Electrode | Insulating Layer | Filling Portion | Frequency of Occurrence of Leakage Current |
|---|---|---|---|---|---|
| Example 4 | $HfO_2/SiO_2$ superlattice layer | Ru | — | silane crosslinkable resin | 2% |
| Comparative Example 3 | $HfO_2/SiO_2$ superlattice layer | Ru | — | — | 86% |

From the above results, it was confirmed that the frequency of occurrence of the leakage current is small in Example 4 in which the inside of the pores is filled with the silane crosslinkable resin.

Since the capacitor of the present invention has high reliability, it is suitably used for various electronic devices.

DESCRIPTION OF REFERENCE SYMBOLS 1a to 1c: Capacitor
2: Conductive porous base material
3: Pore
4: Dielectric layer
5: Upper electrode
6: Filling portion
8: First external electrode
9: Second external electrode
10: Porous portion
12: Low void ratio portion
15: Insulating layer
101: Dielectric layer
102: Upper electrode layer
103: Metal base material
104: Inside of pores
105: Exposed portion
106: Electron

The invention claimed is:
1. A capacitor comprising:
a conductive porous base material having a porous portion with a plurality of pores;
a dielectric layer on the conductive porous base material and extending into the plurality of pores;
an upper electrode on the dielectric layer and extending into at least some of the plurality of pores; and an insulating material on the upper electrode and extending into the at least some of the plurality of pores along with the upper electrode.

2. The capacitor according to claim 1, wherein the insulating material is one of a resin material and an insulating inorganic material.

3. The capacitor according to claim 1, wherein the insulating material is selected from the group of epoxy resin, phenol resin, polyimide resin, silicone resin, silane cross-linkable resin, $Al_2O_3$, $SiO_2$, and SiN.

4. The capacitor according to claim 1, wherein the insulating material is one of an epoxy resin and a phenolic resin.

5. The capacitor according to claim 1, wherein the insulating material is a silicon-containing material.

6. The capacitor according to claim 1, wherein a filling ratio of the insulating material is 50% to 100% by volume with respect to all of the plurality of pores of the porous portion.

7. The capacitor according to claim 1, wherein the insulating material is in the form of an insulating layer that covers the upper electrode in the plurality of pores.

8. The capacitor according to claim 7, wherein the insulating layer is one of $Al_2O_3$ and $SiO_2$.

9. The capacitor according to claim 7, further comprising a filling material filling the at least some of the plurality of pores.

10. The capacitor according to claim 9, wherein the filling material is one of an epoxy resin and a phenolic resin.

11. The capacitor according to claim 9, wherein the filling material is a silicon-containing material.

12. The capacitor according to claim 9, wherein a filling ratio of the filling material is 50% to 100% by volume with respect to all of the plurality of pores of the porous portion.

13. The capacitor according to claim 1, wherein a void ratio of the porous portion is 20% to 90%.

14. The capacitor according to claim 13, further comprising a low void ratio portion surrounding the porous portion, the low void ratio portion having a lower void ratio than that of the porous portion.

15. The capacitor according to claim 1, wherein the insulating material has a specific resistance of $1 \times 10^{12}$ $\Omega \cdot cm$ or more.

16. The capacitor according to claim 1, wherein the insulating material has a specific resistance of $1 \times 10^{14}$ $\Omega \cdot cm$ or more.

* * * * *